(12) United States Patent
Della-Libera et al.

(10) Patent No.: US 7,752,431 B2
(45) Date of Patent: *Jul. 6, 2010

(54) VIRTUAL DISTRIBUTED SECURITY SYSTEM

(75) Inventors: Giovanni M. Della-Libera, Seattle, WA (US); Christopher G. Kaler, Sammamish, WA (US); Scott A. Konersmann, Sammamish, WA (US); Butler W. Lampson, Cambridge, MA (US); Paul J. Leach, Seattle, WA (US); Bradford H. Lovering, Seattle, WA (US); Steven E. Lucco, Bellevue, WA (US); Stephen J. Millet, Edmonds, WA (US); Richard F. Rashid, Redmond, WA (US); John P. Shewchuk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/254,264

(22) Filed: Oct. 20, 2005

(65) Prior Publication Data

US 2006/0041743 A1 Feb. 23, 2006

Related U.S. Application Data

(62) Division of application No. 10/068,444, filed on Feb. 6, 2002.

(60) Provisional application No. 60/329,796, filed on Oct. 16, 2001, provisional application No. 60/346,370, filed on Oct. 19, 2001.

(51) Int. Cl.
*H04L 29/06* (2006.01)
(52) U.S. Cl. ...................... 713/151; 709/229

(58) Field of Classification Search ............. 713/151, 713/156; 705/59; 709/225
See application file for complete search history.

(56) References Cited

U.S. PATENT DOCUMENTS

| 4,953,210 | A | 8/1990 | McGlynn |
| 5,067,104 | A | 11/1991 | Krishnakumar |
| 5,224,098 | A | 6/1993 | Bird |
| 5,438,508 | A | * | 8/1995 | Wyman ..................... 705/8 |
| 5,499,343 | A | 3/1996 | Pettus |

(Continued)

FOREIGN PATENT DOCUMENTS

EP 1003308 5/2000

(Continued)

OTHER PUBLICATIONS

Ccie Fundamentals: Network Design and Case Studies, Second Edition, by Cisco Systems, Inc. Publisher: Cisco Press Pub Date: Oct. 19, 1999 Print Isbn-10: 1-57870-167-8.*

(Continued)

*Primary Examiner*—Farid Homayounmehr
(74) *Attorney, Agent, or Firm*—Workman Nydegger

(57) ABSTRACT

A distributed security system is provided. The distributed security system uses a security policy that is written in a policy language that is transport and security protocol independent as well as independent of cryptographic technologies. This security policy can be expressed using the language to create different security components allowing for greater scalability and flexibility. By abstracting underlying protocols and technologies, multiple environments and platforms can be supported.

20 Claims, 10 Drawing Sheets

U.S. PATENT DOCUMENTS

| | | | | |
|---|---|---|---|---|
| 5,509,000 | A | 4/1996 | Oberlander | |
| 5,608,551 | A | 3/1997 | Biles et al. | |
| 5,680,551 | A | 10/1997 | Martino | |
| 5,761,477 | A | 6/1998 | Wahbe et al. | |
| 5,862,411 | A | 1/1999 | Kay | |
| 5,903,882 | A | 5/1999 | Asay | |
| 5,917,912 | A * | 6/1999 | Ginter et al. | 713/187 |
| 5,935,219 | A | 8/1999 | Holmes | |
| 5,968,176 | A | 10/1999 | Nessett | |
| 5,974,416 | A | 10/1999 | Anand | |
| 5,978,836 | A | 11/1999 | Ouchi | |
| 6,006,259 | A | 12/1999 | Adelman et al. | |
| 6,026,441 | A | 2/2000 | Ronen | |
| 6,047,324 | A | 4/2000 | Ford | |
| 6,073,242 | A * | 6/2000 | Hardy et al. | 726/1 |
| 6,119,171 | A | 9/2000 | Alkhatib | |
| 6,122,363 | A | 9/2000 | Friedlander | |
| 6,144,961 | A | 11/2000 | De La Salle | |
| 6,151,618 | A | 11/2000 | Wahbe et al. | |
| 6,158,010 | A | 12/2000 | Moriconi | |
| 6,199,112 | B1 | 3/2001 | Wilson | |
| 6,209,124 | B1 | 3/2001 | Vermeire | |
| 6,216,231 | B1 * | 4/2001 | Stubblebine | 726/10 |
| 6,219,790 | B1 | 4/2001 | Lloyd | |
| 6,233,619 | B1 | 5/2001 | Marisi | |
| 6,243,749 | B1 | 6/2001 | Sitaraman et al. | |
| 6,304,913 | B1 | 10/2001 | Rune | |
| 6,351,748 | B1 | 2/2002 | Deen | |
| 6,356,920 | B1 | 3/2002 | Vandersluis | |
| 6,393,456 | B1 | 5/2002 | Ambler | |
| 6,405,212 | B1 | 6/2002 | Samu | |
| 6,405,337 | B1 | 6/2002 | Grohen | |
| 6,408,342 | B1 | 6/2002 | Moore | |
| 6,446,113 | B1 | 9/2002 | Ozzie | |
| 6,449,638 | B1 | 9/2002 | Wecker | |
| 6,453,356 | B1 | 9/2002 | Sheard | |
| 6,466,971 | B1 | 10/2002 | Humpleman | |
| 6,477,580 | B1 | 11/2002 | Bowman-Amuah | |
| 6,487,552 | B1 | 11/2002 | Lei | |
| 6,496,849 | B1 | 12/2002 | Hanson | |
| 6,505,233 | B1 | 1/2003 | Hanson | |
| 6,505,254 | B1 | 1/2003 | Johnson | |
| 6,507,823 | B1 | 1/2003 | Nel | |
| 6,507,865 | B1 | 1/2003 | Hanson | |
| 6,522,631 | B2 | 2/2003 | Rosborough | |
| 6,523,063 | B1 | 2/2003 | Miller | |
| 6,532,213 | B1 | 3/2003 | Chiussi | |
| 6,532,455 | B1 | 3/2003 | Martin | |
| 6,546,419 | B1 | 4/2003 | Humpleman | |
| 6,571,236 | B1 | 5/2003 | Ruppelt | |
| 6,578,066 | B1 | 6/2003 | Logan | |
| 6,601,171 | B1 * | 7/2003 | Carter et al. | 713/175 |
| 6,601,189 | B1 | 7/2003 | Edwards | |
| 6,615,258 | B1 | 9/2003 | Barry | |
| 6,618,825 | B1 | 9/2003 | Shaw | |
| 6,654,344 | B1 | 11/2003 | Toporek | |
| 6,665,657 | B1 | 12/2003 | Dibachi | |
| 6,667,974 | B1 | 12/2003 | Shigeta | |
| 6,675,261 | B2 | 1/2004 | Shandony | |
| 6,678,827 | B1 * | 1/2004 | Rothermel et al. | 726/6 |
| 6,724,726 | B1 | 4/2004 | Coudreuse | |
| 6,728,767 | B1 | 4/2004 | Day | |
| 6,742,114 | B1 * | 5/2004 | Carter et al. | 713/156 |
| 6,745,197 | B2 | 6/2004 | McDonald | |
| 6,748,453 | B2 | 6/2004 | Law | |
| 6,751,562 | B1 | 6/2004 | Blackett | |
| 6,763,040 | B1 | 7/2004 | Hite | |
| 6,782,414 | B1 | 8/2004 | Xue | |
| 6,782,542 | B1 | 8/2004 | Mein | |
| 6,789,118 | B1 | 9/2004 | Rao | |
| 6,850,893 | B2 | 2/2005 | Lipkin | |
| 6,850,979 | B1 | 2/2005 | Saulpaugh | |
| 6,851,054 | B2 | 2/2005 | Wheeler | |
| 6,873,975 | B1 | 3/2005 | Hatakeyama | |
| 6,891,953 | B1 * | 5/2005 | DeMello et al. | 380/277 |
| 6,920,558 | B2 | 7/2005 | Sames | |
| 6,928,442 | B2 | 8/2005 | Farber | |
| 6,970,935 | B1 | 11/2005 | Maes | |
| 6,976,074 | B2 | 12/2005 | Cabrera | |
| 6,990,585 | B2 | 1/2006 | Maruyama | |
| 7,051,339 | B2 | 5/2006 | Deverill | |
| 7,055,143 | B2 | 5/2006 | Ringseth | |
| 7,065,706 | B1 | 6/2006 | Sankar | |
| 7,127,511 | B2 | 10/2006 | Tonouchi | |
| 7,149,802 | B2 | 12/2006 | Cabrera | |
| 7,194,553 | B2 | 3/2007 | Lucco | |
| 7,257,817 | B2 | 8/2007 | Cabrera | |
| 7,293,283 | B2 | 11/2007 | Kaler | |
| 7,409,367 | B2 | 8/2008 | McGill | |
| 7,418,457 | B2 | 8/2008 | Kaler | |
| 7,451,157 | B2 | 11/2008 | Kaler | |
| 2001/0009018 | A1 | 7/2001 | Iizuka | |
| 2002/0002581 | A1 | 1/2002 | Siddiqui | |
| 2002/0078233 | A1 | 6/2002 | Brilils | |
| 2002/0126701 | A1 | 9/2002 | Requena | |
| 2002/0138582 | A1 | 9/2002 | Chandra | |
| 2002/0143984 | A1 | 10/2002 | Hudson | |
| 2002/0152214 | A1 | 10/2002 | Muntz | |
| 2002/0157004 | A1 | 10/2002 | Smith | |
| 2002/0169781 | A1 | 11/2002 | Poole | |
| 2002/0174178 | A1 | 11/2002 | Stawikowski | |
| 2002/0178103 | A1 | 11/2002 | Dan | |
| 2002/0184319 | A1 | 12/2002 | Willner | |
| 2002/0188638 | A1 | 12/2002 | Hamscher | |
| 2003/0041178 | A1 | 2/2003 | Brouk | |
| 2003/0050966 | A1 | 3/2003 | Dutta | |
| 2003/0074357 | A1 | 4/2003 | Nielson | |
| 2003/0074367 | A1 | 4/2003 | Kaler | |
| 2003/0074482 | A1 | 4/2003 | Christensen | |
| 2003/0074579 | A1 | 4/2003 | Della-Libera | |
| 2003/0093678 | A1 | 5/2003 | Bowe | |
| 2003/0120593 | A1 | 6/2003 | Bansal | |
| 2004/0088585 | A1 | 5/2004 | Kaler | |
| 2005/0138353 | A1 | 6/2005 | Spies | |
| 2005/0278390 | A1 | 12/2005 | Kaler | |
| 2006/0041929 | A1 | 2/2006 | Della-Libera | |
| 2006/0212599 | A1 | 6/2006 | Lucco | |
| 2006/0253699 | A1 | 11/2006 | Della-Libera | |
| 2006/0253700 | A1 * | 11/2006 | Della-Libera et al. | 713/151 |
| 2008/0141028 | A1 | 6/2008 | Wei | |
| 2008/0263166 | A1 | 10/2008 | Beigi | |
| 2009/0046726 | A1 | 2/2009 | Cabrera | |

FOREIGN PATENT DOCUMENTS

| | | |
|---|---|---|
| JP | 7141296 | 6/1995 |
| JP | 11204471 | 7/1999 |
| JP | 11328033 | 11/1999 |
| JP | 2000083049 | 3/2000 |
| JP | 2000253066 | 9/2000 |
| JP | 2000516406 | 12/2000 |
| JP | 2000516407 | 12/2000 |
| JP | 2002507295 | 5/2002 |
| WO | 9534972 | 12/1995 |
| WO | 9854644 | 12/1998 |
| WO | 9937066 | 7/1999 |
| WO | 0004458 | 1/2000 |
| WO | 0042748 | 7/2000 |
| WO | 0158108 | 8/2001 |
| WO | 2007073609 | 7/2007 |

OTHER PUBLICATIONS

Website www.tibco.com; TIBCO Rendezvous.
Website www.tibco.com; TIBCO Rendezvous TX.

Website www.tibco.com; TIBCO Enterprise for JMS.

Website www.gotdotnet.com; Nielsen, Thatte; "Soap Routing Protocol", May 23, 2001.

Malan, Jahanian, "An Extensible Probe Architecture for Network Protocol Performance Measurement", 1998, pp. 215-227.

Toumura, Kato, Matsubara, "Implementing Multiple Name Spaces Using an Active Network Technology", book, Jun. 2000, pp. 1665-1676, vol. 41, No. 6.

Potter, St. Amand, "Connecting Minis to Local Nets With Discrete Modules", magazine,—Data Communications, Jun. 1983, pp. 161-164.

Dean, Kumpf & Wnezel, "Cone: A Software Environment for Network Protocols", Hewlett Packard Journal, Feb. 1990, pp. 18-28.

Kouda, Tanaka, "Representation of Descriptive Name and the Resolution Method with a Semantic Network Structure", Journal of Information Processing, vol. 15, No. 2, 1992, pp. 280-292.

website www.gotdotnet.com, Nielsen, Sanders, Christensen, "Direct Internet Message Encapsulation", May 23, 2001.

Post-Newsweek Business Information, Inc., Newsbytes, May 2, 1996, "Apple's Free Internet Domain Name Server Software", California.

Ramsey, Electronic Engineering Times, 1995, n865, p. 76.

Conference paper, "Procedings of CFSE: First French Conference on Operating Systems", Jun. 8-11, 1999, publication date 1999, France.

Conference—Proceedings—Twenty Third Annual International Computer Software and Applications Conference, publication date 1999, USA , date Oct. 27-29, 1999.

Cantor, "The ICAAP Project 3 OSF Distributed Computing Enviornment", journal—Library Hi Tech, vol. 15, No. 1-2, p. 79-83, publication date 1997, USA.

Simms, "Windows on the Internet", journal—Wall Street & Technology, suppl. issue p. 16, 18-19, publication date fall 1997, USA.

Dorward, Pike, Presotto, Ritchie, Trickey, Winterbottom; "The Inferno /sup TM/ operating System", journal—Bell Labs Technical Journal, vol. 2, No. 1, p. 5-18 publication date winter 1997, USA.

Benner, Russell, "Practical High-Impedance Fault Detection on Distribution Feeders", Journal—IEEE Transactions on Industry Applications, vo. 33, No. 3. p. 635-40, publication date May-Jun. 1997, USA.

Conference—Jones, "Computer Use Policies, the Challenge of Updating lab Software Security", User Services Conference XXI Part vol. 1, pp. 222-224, vol. 1, publication date 1993, USA.

Conferene—Schwartau, Proceedings of International Conference Virus Bulletin, date Sep. 9-10, 1993, location Amsterdam, publication date 1993, UK.

Udell, "LAN Manager 2.0: A force to be Reckoned With", journal—Byte, vol. 15, No. 13, pp. 221-222, 224, 226, publication date Dec. 1990, USA.

Conference—Olson, Levine, Jones, Bodoff, Bertrand, "Proceedings of the Summer 1988 USENIX Conference", pp. 287-94, publication date 1988, USA, conference date Jun. 21-24, 1988—San Francisco.

SOAP Security Extensions: Digital Signature, W3C NOTE Feb. 6, 2001, http://www.w3.org/TR/2001/NOTE-SOAP-dsig-20010206/.

IP Encapsulating Security Payload (ESP), Ipsec Working Group, Internet Draft, Draft-ietf-ipsec-esp-v3-03.txt, Expires Jan. 2003, S. Kent, BBN Technologies, Jul. 2002.

Http://www.w3.org/TR/2001/PR-xmldsig-core-20010820/.

Eastlake et al. RFC 3075, XML Signature Syntax and Processing.

An Introduction to XML Digital Signatures, Simon et al., http://www.xml.com/pub/a/2001/08/08/xmldsig.html.

Kees Leune, Mike Papazoglou, Willem-Jan Van Den Heuvel, "Specification and Querying of Security Constraintss in the EFSOC Framwork", Nov. 2004, ICSOC '04: Proceedings of the 2nd International Conference on Service Oriented Computing, pp. 125-133.

Partial European Search Report dated Apr. 19, 2006 (02023016.5), 3 pages.

Rotzal, Peter H., "X 400 Message Handling System: The Remote User Agent," Proceedings of the Military Communications Conference (MILCOM), Jun. 11, 1995, vol. 1, pp. 433-437.

European Search Report dated Jun. 28, 2006 (02023016.5), 6 pages.

Mourad, A. et al., "Scalable Web Server Architectures"; Proceeding IEEE International Symposium on Computer and Communications; Jul. 1, 1999; pp. 12-16; WP000199852.

Xinghuo Yu; Zhihong Man; "Finite *time* *output* Tracking Problem woth Terminal Sliding Mode Control," Computational Engineering in Systems Applications, Part vol. 1, pp. 28-31, vol. 1, Publisher: Gerf EC Lille—Cite Scientifique, Lille France.

Edge, S.W. "An Adaptive *timeout* Algorithm for Retransmission Across a Packet Switching Network", Computer Communication Review, vol. 14, No. 2, pp. 248-255, Published in USA.

Wallstrom, Bengt, "Queueing System with *Time*-*Outs* and Random Departures", Ericsson Techincs, v 33 n 2 1977, pp. 151-174.

Using Dublin Core, issued Jul. 16, 2000 by Diane Hillmann, pp. 1-10.

Structured Graph Format: XML Metadata for describing website structure, Liechi et al. pp. 11-21, Issued 1998.

Samjani, "Mobile Internet Protocol", IEEE Potentials, vol. 20, No. 1, Feb.-Mar. 2001, pp. 16-18.

Mourad, A. et al., "Scalable Web Server Architectures"; Proceeding IEEE International Symposium on Computer and Communications; Jul. 1, 1999; pp. 12-16; WP000199852.

"IP Routing Policies and Filters", printed from http://support.baynetworks.com/library/tpubs/html/switches/bstream/115401A/L__17.htm on Sep. 26, 2002.

K. Swaminathan, "Negotiated Access Control", Proceedings of the 1985 Symposium on Security and Privacy: Apr. 22-24, 1985, pp. 190-196.

W. LeFebvre, "Permissions and Access Control Lists", Performance Computing, vol. 16, No. 11, Oct. 1998, pp. 59-61.

B. Dunkel et al., "Customized Metadata for Internet Information", 1997 First International Conference on Knowledge-Based Intelligent Electronic Systems: Proceedings, vol. 2, May 21-23, 1997, pp. 508-516.

U. Srinvasan et al., "Managing Heterogeneous Information Systems through Discovery and Retrieval of Generic Concepts", Journal of the American Society for Information Science, vol. 51, No. 8, Jun. 2000, pp. 707-723.

J. Martinez et al., "MPEG-7 the Generic Mulitmedia Content Description Standard, Part 1", vol. 9, No. 2, Apr.-Jun. 2002, pp. 78-87.

C. Süβ et al., "Meta-modeling for Web-Based Teachware Management", Advance in Conceptual Modeling: ER '99 Workshops on Evolution and Change in Data Management, Reverse Engineering in Information Systems, and the World Wide Web and Conceptual Modeling, 1999, 360-373.

K. Lang et al., "XML, Metadata and efficient Knowledge Discovery", Knowledge-Based Systems, vol. 13, No. 5, Oct. 2000, pp. 321-331.

T. Baker, "A Multilingual Registry for Dublin Core Elements and Qualifiers", ZfBB 47, 2000, pp. 14-19.

J. Moy, OSPF Version 2, Networking Working Group, RFC 2328, Ascend Communications, Inc., Apr. 1998, pp. 1-204.

J. Moy, OSPF Version 2, Networking Working Group, RFC 1247, Proteon, Inc., Jul. 1991, pp. 1-177.

Nikkei Network, No. 17, Sep. 2001, pp. 94-97.

"Windows NT TCP/IP Networking 9. DNS (Domain Name System)", Let's Start with TCP/IP, Dec. 31, 2000, pp. 156-159.

"Preliminary Knowledge for Managing a Website, Basic Knowledge of Domain Name," Basics of Creating a Website Which Can Be Understood With the Help of Illustration, Aug. 31, 2000, pp. 179-185.

Nikkei Network, No. 4, Aug. 2000, pp. 104-112.

Nikkei Byte, No. 211, Dec. 2000, pp. 176-181.

Nikkei Communications, No. 355, Feb. 5, 2001, pp. 106-113.

Nikkei Communications, No. 340, Apr. 16, 2001, pp. 216-217.

Henrick F. Nielsen et al., "Direct Internet Message Encapsulation", May 23, 2001, 13 Pages.

Richard Bowers, "Apple's Free Internet Domain Name Server Software", Post-Newsweek Business Information, Inc., May 2, 1996, 1 Page.

Office Action dated Oct. 4, 2005 cited in U.S. Appl. No. 10/068,444 (Copy Attached).

Office Action dated Mar. 31, 2006 cited in U.S. Appl. No. 10/068,444 (Copy Attached).

Office Action dated Oct. 13, 2006 cited in U.S. Appl. No. 10/068,444 (Copy Attached).

Office Action dated Jan. 26, 2009 cited in U.S. Appl. No. 11/442,106 (Copy Attached).

Office Action dated Nov. 17, 2003 cited in U.S. Appl. No. 10/219,898 (Copy Attached).
Office Action dated Apr. 21, 2004 cited in U.S. Appl. No. 10/219,898 (Copy Attached).
Office Action dated Oct. 6, 2004 cited in U.S. Appl. No. 10/219,898 (Copy Attached).
Office Action dated Oct. 26, 2006 cited in U.S. Appl. No. 10/219,898 (Copy Attached).
Office Action dated Mar. 26, 2007 cited in U.S. Appl. No. 10/219,898 (Copy Attached).
Notice of Allowance dated Aug. 15, 2007 cited in U.S. Appl. No. 10/219,898 (Copy Attached).
Office Action dated Mar. 22, 2007 cited in U.S. Appl. No. 10/693,290 (Copy Attached).
Office Action dated Sep. 20, 2007 cited in U.S. Appl. No. 10/693,290 (Copy Attached).
Office Action dated Mar. 28, 2008 cited in U.S. Appl. No. 10/693,290 (Copy Attached).
Notice of Allowance dated Oct. 15, 2008 cited in U.S. Appl. No. 10/693,290 (Copy Attached).
Office Action dated Jan. 7, 2005 cited in U.S. Appl. No. 09/983,555 (Copy Attached).
Office Action dated Jul. 7, 2005 cited in U.S. Appl. No. 09/983,555 (Copy Attached).
Office Action dated Mar. 23, 2006 cited in U.S. Appl. No. 09/983,555 (Copy Attached).
Office Action dated Sep. 11, 2006 cited in U.S. Appl. No. 09/983,555 (Copy Attached).
Office Action dated Sep. 21, 2004 cited in U.S. Appl. No. 09/993,656 (Copy Attached).
Office Action dated Dec. 23, 2004 cited in U.S. Appl. No. 09/993,656 (Copy Attached).
Office Action dated Nov. 29, 2005 cited in U.S. Appl. No. 09/993,656 (Copy Attached).
Notice of Allowance dated May 25, 2007 cited in U.S. Appl. No. 09/993,656 (Copy Attached).
Office Action dated Dec. 30, 2004 cited in U.S. Appl. No. 09/983,539 (Copy Attached).
Office Action dated Jun. 17, 2005 cited in U.S. Appl. No. 09/983,539 (Copy Attached).
Office Action dated Jan. 18, 2006 cited in U.S. Appl. No. 09/983,539 (Copy Attached).
Notice of Allowance dated May 8, 2006 cited in U.S. Appl. No. 09/983,539 (Copy Attached).
Office Action dated May 28, 2008 cited in U.S. Appl. No. 11/254,545 (Copy Attached).
Office Action dated May 28, 2008 cited in U.S. Appl. No. 11/254,539 (Copy Attached).
Office Action dated Mar. 7, 2006 cited in U.S. Appl. No. 11/254,519 (Copy Attached).
Office Action dated Aug. 11, 2006 cited in U.S. Appl. No. 11/254,519 (Copy Attached).
Office Action dated Nov. 5, 2004 cited in U.S. Appl. No. 10/007,060 (Copy Attached).
Office Action dated May 5, 2005 cited in U.S. Appl. No. 10/007,060 (Copy Attached).
Notice of Allowance dated Jun. 27, 2005 cited in U.S. Appl. No. 10/007,060 (Copy Attached) Office Action dated Jul. 20, 2005 cited in U.S. Appl. No. 10/999,837 (Copy Attached).
Office Action dated Dec. 21, 2005 cited in U.S. Appl. No. 10/999,837 (Copy Attached).
Office Action dated May 25, 2006 cited in U.S. Appl. No. 10/999,837 (Copy Attached).
Notice of Allowance dated Sep. 18, 2006 cited in U.S. Appl. No. 10/999,837 (Copy Attached).
Office Action dated Nov. 26, 2008 cited in U.S. Appl. No. 11/254,545 (Copy Attached).
Office Action dated Nov. 28, 2008 cited in U.S. Appl. No. 11/254,539 (Copy Attached).
G. Bull et al., "Access Control Lists", printed from http://curry.edschool.virginia.edu/go/spinning/ACL_Permissions.html on Sep. 18, 2002, 5 pages.
Security in JDK 1.1, Access Control Abstractions, May 2, 1997, printed from http://java.sun.com/products/jdk/1.1/docs/guide/security/Acl.html, on Sep. 18, 2002, 4 pages.
T. Saito, et al. "Privacy Enhanced Access Control by SPKI", IEEE, 2000, pp. 301-306.
G. Fernandez et al., "Extending the UNIX Protection Model with Access Control Lists", Proceedings of the Summer 1998 USENIX Conference, Jun. 20-24, 1988, pp. 119-132.
A. Chander et al, "A State-Transition Model of Trust Management and Access Control", Proceedings 14th IEEE Computer Security Foundations Workshop, Jun. 11-13, 2001, pp. 27-43.
D. Wichers et al., "PACL's: An Access Control List Approach to Anti-Viral Security", Information Systems Security: Standards—The Key to the Future: 13th National Computer Security Conference, Oct. 1-4, 1990, pp. 340-349.
M. Benantar et al., "Use of DSOM Before/After Metaclass for Enabling Object Access Control", IRP/IEEE International Conference on Distributed Platforms: Client/Server and Beyond, 1996, pp. 73-85.
M. Koch et al., "Conflict Detection and Resolution in Access Control Policy Specifications", Fossacs 2002, pp. 223-237.
M. Calbucci, "Windows 2000 Security Descriptors", Dr. Dobb's Journal, vol. 25, No. 11, Nov. 2000, pp. 57-58,60,63,66.
J. Hwang, et al., "Access control with role attribute certificates", Computer Standards and Interfaces, vol. 22, No. 1, Mar. 2000, pp. 43-53.
J. Qian, et al., "ACLA: A Framework for Access Control List (ACL) Analysis and Optimization", IFIP TC6/TC11 Joint Working Conference on Communications and Multimedia Security 5th, 2001, pp. 197-211.
Office Action dated May 11, 2009 cited in U.S. Appl. No. 11/207,034 {Copy Attached}.
Notice of Allowance dated Aug. 10, 2009 cited in U.S. Appl. No. 11/422,106 (Copy Attached).
Notice of Allowance dated Oct. 27, 2009 cited in U.S. Appl. No. 11/422,106 (Copy Attached).
Office Action dated Dec. 5, 2008 cited in U.S. Appl. No. 11/207,034 {Copy Attached}.
Office Action dated Jul. 8, 2009 cited in U.S. Appl. No. 11/254,545 (Copy Attached).
Office Action dated Jul. 9, 2009 cited in U.S. Appl. No. 11/254,539 (Copy Attached).
Office Action dated Feb. 23, 2006 cited in U.S. Appl. No. 10/270,442 {Copy Attached}.
Office Action dated Aug. 3, 2006 cited in U.S. Appl. No. 10/270,442 {Copy Attached}.
Office Action dated Jan. 24, 2007 cited in U.S. Appl. No. 10/270,442 {Copy Attached}.
Office Action dated Aug. 8, 2007 cited in U.S. Appl. No. 10/270,442 {Copy Attached}.
Office Action dated Jan. 25, 2008 cited in U.S. Appl. No. 10/270,442 {Copy Attached}.
Office Action dated Sep. 15, 2008 cited in U.S. Appl. No. 10/270,442 {Copy Attached}.
Office Action dated Feb. 26, 2009 cited in U.S. Appl. No. 10/270,442 {Copy Attached}.
Notice of Allowance dated Sep. 1, 2009 cited in U.S. Appl. No. 10/270,442 {Copy Attached}.
Office Action dated Mar. 21, 2007 cited in U.S. Appl. No. 11/207,034 {Copy Attached}.
Office Action dated Oct. 4, 2007 cited in U.S. Appl. No. 11/207,034 {Copy Attached}.
Office Action dated May 28, 2008 cited in U.S. Appl. No. 11/207,034 {Copy Attached}.
Office Action dated Jun. 28, 2005 cited in U.S. Appl. No. 10/270,441 (Copy Attached).
Office Action dated Feb. 6, 2006 cited in U.S. Appl. No. 10/270,441 (Copy Attached).
Office Action dated Jun. 12, 2006 cited in U.S. Appl. No. 10/270,441 (Copy Attached).

Office Action dated Nov. 21, 2006 cited in U.S. Appl. No. 10/270,441 (Copy Attached).
Office Action dated Jun. 13, 2007 cited in U.S. Appl. No. 10/270,441 (Copy Attached).
Office Action dated Mar. 13, 2008 cited in U.S. Appl. No. 10/270,441 (Copy Attached).
Office Action dated Mar. 17, 2009 cited in U.S. Appl. No. 10/270,441 (Copy Attached).
Notice of Allowance dated Dec. 3, 2009 cited in U.S. Appl. No. 10/270,442 (Copy Attached).

* cited by examiner

Admission  804

Policy
```
<policy name ="admission">
   <issueLicense>
      <type>X</type>
      <name>N</name>
      <key>Y</key>
      <sign>L</sign>
   </issueLicense>
   . . .
</policy>
```
802

Figure 8

VIRTUAL DISTRIBUTED SECURITY SYSTEM

This application is a divisional of U.S. patent application Ser. No. 10/068,444, filed Feb. 6, 2002 which relates to and claims priority from U.S. Provisional Application No. 60/329,796, filed Oct. 16, 2001, and U.S. Provisional Application No. 60/346,370, filed Oct. 19, 2001, each of which is herein incorporated by reference.

BACKGROUND OF THE INVENTION

1. Field of the Invention

The present invention relates to the field of computer security systems. More particularly, the invention provides methods and devices for providing security to distributed computer systems.

2. Description of Related Art

Security frameworks have been developed to protect data transmitted in distributed computing systems. Existing security frameworks have an assortment of degrees of privacy, security, adaptability and scalability. The Kerberos system, for example, provides secure communications by users sharing a key with a third party. In order to conduct secure communications, each party connects to the third party and utilizes the key issued by the third party. Among other disadvantages, the Kerberos system allows the third party to track the identities of users who are communicating with each. Furthermore, the third party has the ability to decrypt messages because the third party issues the keys. The Kerberos security model is fixed; that is, administrators have limited flexibility in deployment options.

Other existing security systems have merits and limitations. For example, security systems that utilize public key and private key infrastructures can include time-consuming and expensive encryption and decryption steps. Time consuming encryption and decryption steps can limit the scalability of a security system if they are performed too frequently. As well, PKI infrastructures often have revocation issues and many don't address the issue of management of multiple trust roots or cross-certification. Most solutions are designed for specific purposes, e.g., SSL or IPsec. Existing security systems have also generally focused on specific cryptographic technologies. For example, Kerberos uses symmetric keys and PKI uses public keys.

There exists a need in the art for a generic security framework, for use with distributed computing systems, that is security protocol independent and that can be scaled for use with wide area networks, such as the Internet, and that is independent of the underlying cryptographic mechanisms being used.

BRIEF SUMMARY OF THE INVENTION

The present invention overcomes one or more problems and limitations of the prior art by providing a generic security framework that is transport and security protocol independent and that can support multiple cryptographic technologies. The security framework utilizes a security policy which may describe the components of the framework, their properties, capabilities, requirements, and interactions. The policy is expressed using a security policy language. The security policy language allows different security components to be defined and configured without changing application code. Using this mechanism, a specific set of security services can be defined which meet the needs of a specific deployment. Furthermore, the security components allow the security services to be partitioned to increase both flexibility and scalability. By capturing the security semantics within a language, the underlying implementation is abstract thereby creating a "virtual distributed security system." Furthermore, with the security semantics expressed in language, the underlying protocols are abstracted allowing the security runtime to support different platforms, technologies, and protocols. Finally, with a security policy definition in language form, it is possible to construct proofs of the security system.

BRIEF DESCRIPTION OF THE DRAWINGS

The present invention is illustrated by way of example and not limited in the accompanying figures in which like reference numerals indicate similar elements and in which:

FIG. 8 illustrates a security policy, in accordance with an embodiment of the invention;

DETAILED DESCRIPTION OF THE INVENTION

Aspects of the present invention are suitable for use in a variety of distributed computing system environments. In distributed computing environments, tasks may be performed by remote computer devices that are linked through communications networks. Embodiments of the present invention may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, network PCS, minicomputers, mainframe computers, and the like.

The invention will be described in the general context of computer-executable instructions, such as program modules, that are executed by a personal computer or a server. Generally, program modules include routines, programs, objects, components, data structures, etc., that perform particular tasks or implement particular abstract data types. Typically the functionality of the program modules may be combined or distributed as desired in various environments.

Embodiments within the scope of the present invention also include computer readable media having executable instructions. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
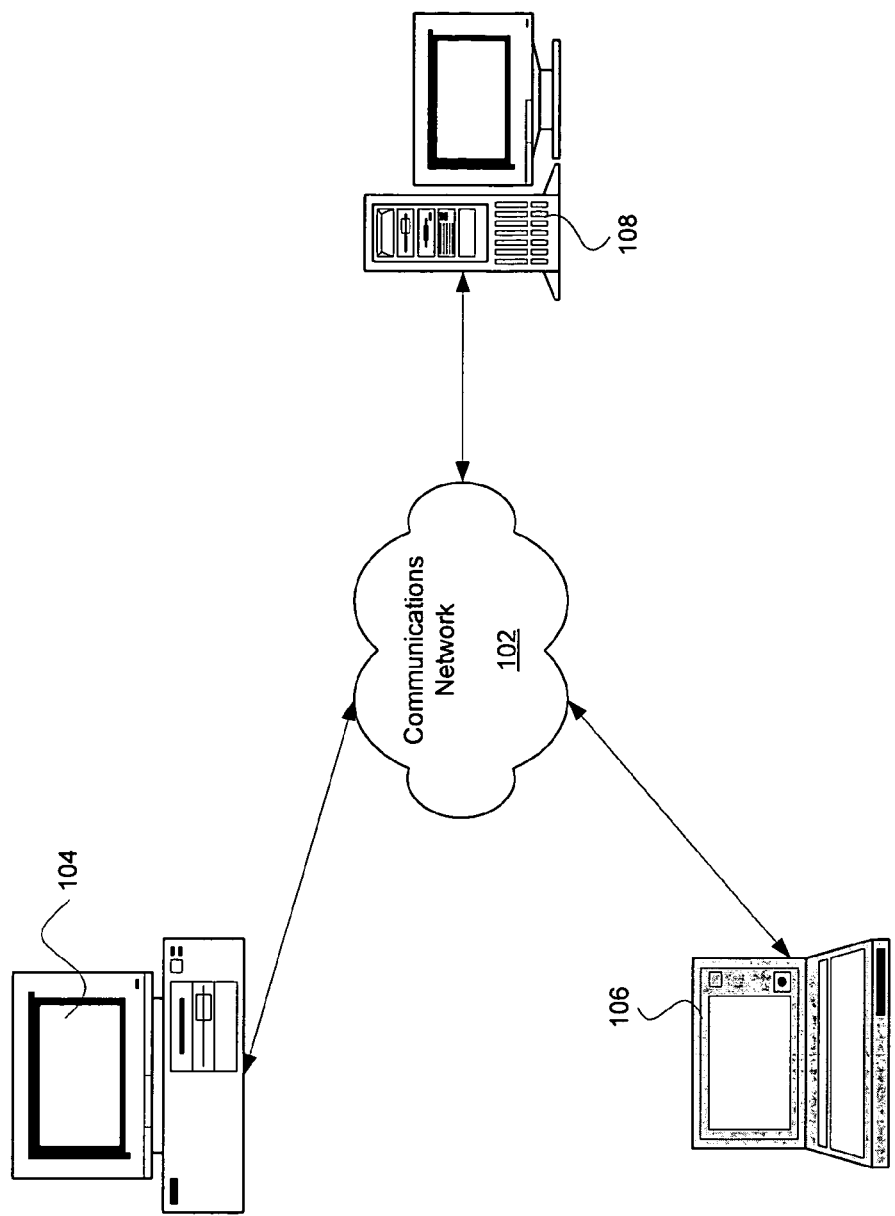
FIG. 1 illustrates an exemplary distributed computing system operating environment.

FIG. 1 illustrates an example of a suitable distributed computing system 100 operating environment in which the invention may be implemented. Distributed computing system 100 is only one example of a suitable operating environment and is not intended to suggest any limitation as to the scope of use or functionality of the invention. System 100 is shown as including a communications network 102. The specific network implementation used can be comprised of, for example, any type of local area network (LAN) and associated LAN topologies and protocols; simple point-to-point networks (such as direct modem-to-modem connection); and wide area network (WAN) implementations, including public Internets and commercial based network services such as Microsoft® Network. Systems may also include more than one communication network, such as a LAN coupled to the Internet.

Computer device 104, computer device 106 and computer device 108 may be coupled to communications network 102 through communication devices. Network interfaces or adapters may be used to connect computer devices 104, 106 and 108 to a LAN. When communications network 102 includes a WAN, modems or other means for establishing a communications over WANs may be utilized. Computer devices 104, 106 and 108 may communicate with one another via communication network 102 in ways that are well known in the art. The existence of any of various well-known protocols, such as TCP/IP, Ethernet, FTP, HTTP and the like, is presumed.

Computers devices 104, 106 and 108 may exchange content, applications, messages and other objects via communications network 102. In some aspects of the invention, computer device 108 may be implemented with a server computer or server farm. Computer device 108 may also be configured to provide services to computer devices 104 and 106.

Figure 2:
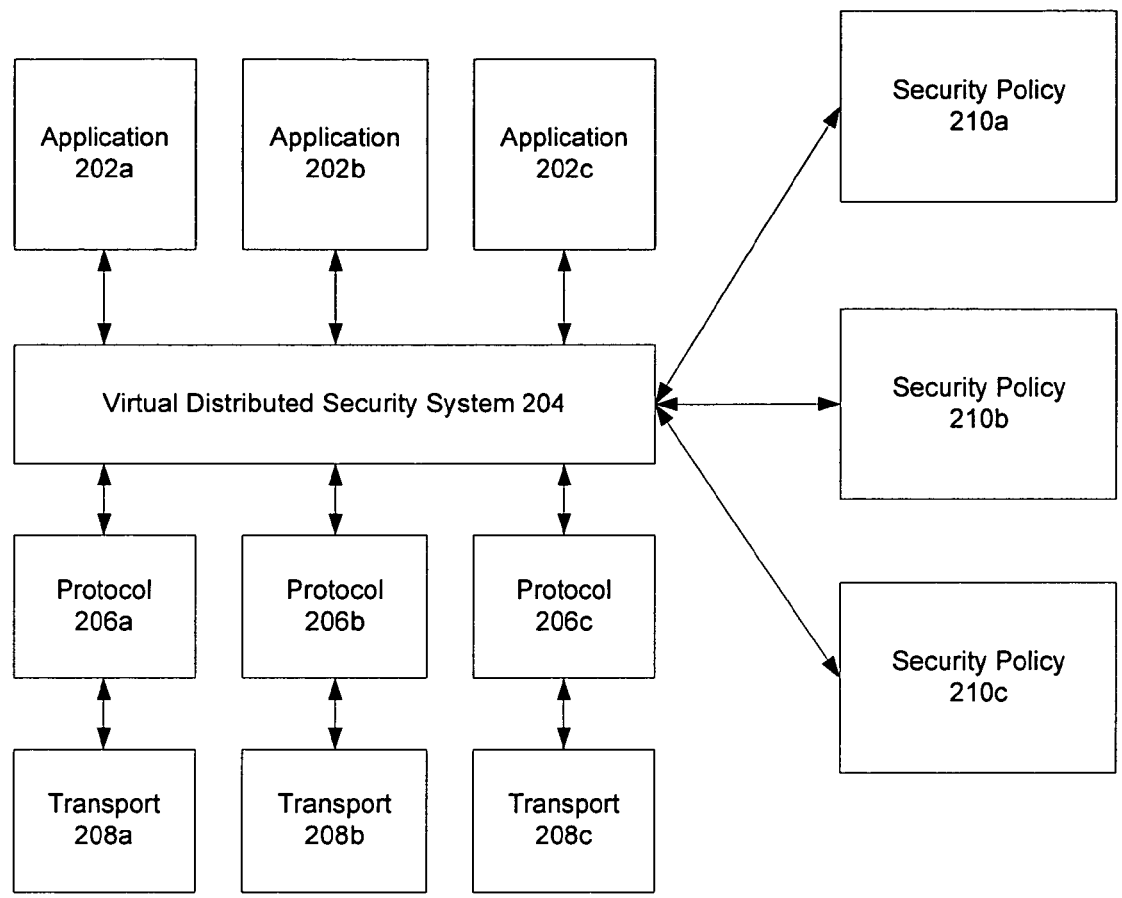
FIG. 2 illustrates an architecture of a virtual distributed security system, in accordance with an embodiment of the invention.

FIG. 2 illustrates an architecture of a virtual distributed security system in accordance with an embodiment of the invention. Applications 202a, 202b, and 202c use a virtual distributed security system 204 for security-related operations. Virtual distributed security systems 204 may use one or more security policies 210a-210c (for establishing security rules and procedures and implement the security policy with one or more protocols 206a-206c and transports 206a-206c). In one embodiment of the invention, applications 202a, 202b and 202c or other entities may negotiate over the use of a security policy. In particular, the entities may exchange messages to negotiate over portions of security polices 210a-210c to use as a custom security policy. Security policies 210a-210c are described in detail below and be written in a common or different security policy language. In one embodiment, virtual distributed security system 204 is implemented with a set of application programming interfaces (APIs). However, those skilled in the art recognize that there are many alternative mechanisms for implementing virtual distributed security system 204. For example, in other embodiments virtual distributed security system 204 could be fully distributed and/or implemented with a set of services. In yet another embodiment virtual distributed security system 204 could be implemented with a set of Java beans or other Java language derivative.

Security policies 210a-210c may describe the behaviors of components of a system or an overall security semantics of a system. For example, when sending a message, a security policy may require that the message be signed in a specific way or that multiple signatures of specific forms must be present, that certain credentials must be presented and that at least a portion of the message is encrypted. In another example, a security policy may identify the steps that must be taken before accessing a service.

The security policy may be authored by a system administrator or an application developer. Instead of a limited number of access control rules like prior art methods, aspects of the present invention allow users and applications to create new access and other rules by creating or modifying a security policy. For example, for a particular service, an administrator may want users to have a special read access. In prior art systems, the rights that may be utilized are hard coded within the security system. For example, Windows NT operating systems has 32 defined permission rights. With the present invention, the administrator can define new rights by defining or editing a security policy. The security policy may be capability based, i.e., an application may define a capability and virtual distributed security system 204 may provide that capability.

Security policies 210a-210c may be authored in a security policy language. The security policy language may be used to describe the security components, their properties, capabilities, requirements, interaction semantics and other security aspects. Those skilled in the art will appreciate that such a language could be expressed in many different forms. In some embodiments, the security language may be a logic-based language, such as Prolog or some derivative. In other embodiments, the security language may be rule-based or a procedural based. Of course, the security language may also be any combination of logic-based, rule based or procedural based. In one embodiment, security policies 210a-210c are implemented with extensible markup language (XML) documents.

Figure 3:
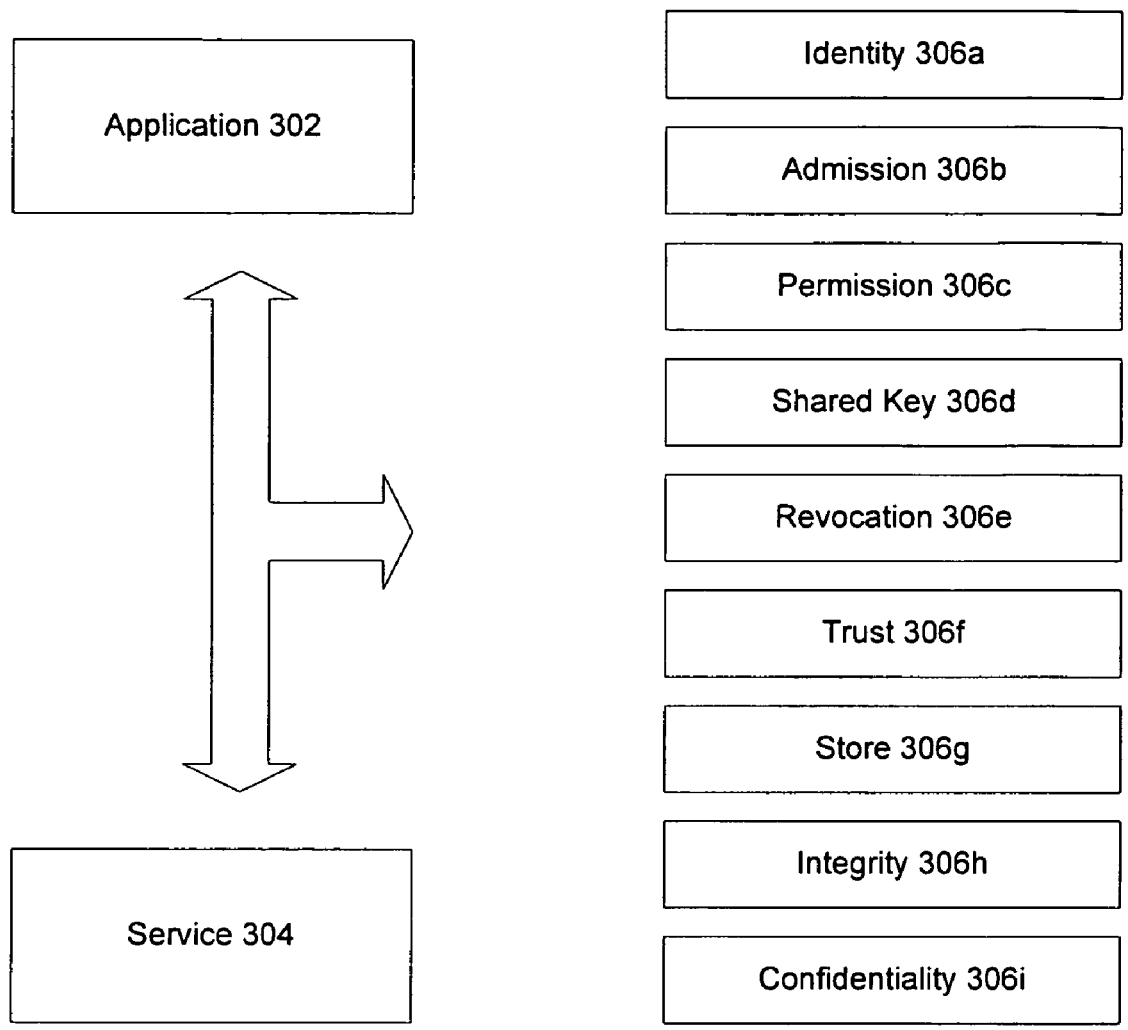
FIG. 3 illustrates a sample set of security components that may be defined by a security policy, in accordance with an embodiment of the invention.

FIG. 3 illustrates a sample set of security components 306a-306i that may be defined by a security policy. Security components 306a-306i may be implemented with library routines, separate services, or other mechanisms. An application 302 is interacting with a service 304. Security components 306a-306i provide a security environment for this communication.

An identity component 306a may provide a mechanism to authenticate a principal and provide authoritative proof of the identity. Proof of an identity may be established with a credential, ticket, license, or some other mechanism acceptable to identity component 306a. Aspects of the present invention are described below with respect to licenses. A license contains a set of assertions and is signed by an authority. One skilled in the art will appreciate that in alternative embodiments, credentials, tickets or other mechanisms may be utilized.

An admission component 306b may provide a mechanism for regulating access to a trust domain of service 304. Admission component 306b may map external credentials to internal credentials. For example, application 302 may provide public key credentials to admission component 306b, and admission component 306b may return symmetric key credentials to application 302.

A permission component 306c may provide a mechanism for pre-fetching rights, capabilities, or other access control information. Permission component 306c allows service 304 to compare signed credentials received from permission component 306c with the required rights/capabilities for the operation requested by application 302. Comparing rights is generally more efficient for service 304 than "fetching" rights, particularly in embodiments where rights do not change.

A shared key component 306d may provide a mechanism to securely share secrets between service 304, security components 306, and other services that exist within a trust domain of service 304. For example, if the admission service 306b returned a symmetric key license, it may be encoded using a shared key for the trust domain. Service 304 can obtain the shared key used by admission service 306b from shared key service 306d and use the shared key to decode the license.

A revocation component 306e may provide a mechanism for tracking revocation. For example, credentials issued outside the trust domain might be monitored for revocation, for example, using certificate revocation lists (CRLS). Revocation component 306e may also monitor usage within the trust domain and revoke credentials, tickets, licenses, or other mechanisms that are being misused. For example, an administrator can set limits on licenses for application 302 such as call limits, time limits, or frequency limits. A call limit may limit the number of times a license may be utilized. A time limit may limit a license to a specific time period and a frequency limit may limit the number of times a license can be utilized within a given time period. If application 302 exceeds these limits, the license can be revoked. When coupled with a metering system, this provides a mechanism to limit the exposure of a denial of service attack, especially if it is accidental. This mechanism is also important when dealing with server farms. In prior art systems, limits are typically divided by the number of servers and allocated accordingly. For example, if there are 10 servers and there is a call limit of 20, each individual server will have a call limit of 2. In other prior art systems, the call limit is applied to each server. As a result, with 10 servers and a call limit of 20, the actual call limit can be 200. Revocation component 306e may track the activity of all of the servers and ensure that the call limit is not exceeded. Of course, propagation delays between servers and revocation component 306e or a metering system may cause a call limit to be slightly exceeded in some cases.

A trust component 306f may provide a mechanism for managing trust relationships. Trust component 306f may utilize a trust policy or trust statement to indicate how an entity is trusted and/or the extent to which an entity is trusted. A trust relationship allows a first entity to trust a second entity when the first entity trusts an authority that issues a license to the second entity. In some embodiments, entities may define the scope of the trust. For example, a first entity may trust a second entity for transactions with certain URLs. Trust relationships may contain a cryptographic component. For example, with public keys embodiments, certification chains are processed and, eventually, a certificate may be signed by a trusted authority. This mechanism maintains the trusted identities and their certificates so that they cannot be altered without proper authorization. Similarly, a party may not trust the root of another party's certificate, but may countersign or trust a countersignature on the certificate (cross certification). In many circumstances trusts may be shared across different applications and services or even instances (e.g. farms) of a service. In such an environment trust component 306f provides a mechanism for the trusting parties to be notified or obtain updates including additions, changes, or deletions of trusted parties. Those skilled in the art recognize that there can be multiple mechanisms for distributing updates, including, but not limited to, polling and eventing and a security policy may make selections among the available options.

Trust component 306f may provide a trust mechanism that spans enterprises or organizations. For example, application 302 may work with service 304 in a specific contract to deal with parts ordering and tracking. While application 302 and service 304 may be running at different companies, application 302 and service 304 may both also interact with another entity, such as a parts company. Application 302 and service 304 may both choose to trust any entity that the parts company specifies as trusted (e.g. its sub-contractors).

A store component 306g may provide a mechanism for storing, retrieving, encrypting and managing credentials, such as licenses. Store component 306g may be used as a lockbox (personal storage), a directory, a registry, an escrow or other storage mechanism. Furthermore, store component 306g can verify the stored licenses, including periodic revocation checks and countersign the credentials allowing parties that trust store component 306g to optimize processing and skip validation checks.

Figure 4:
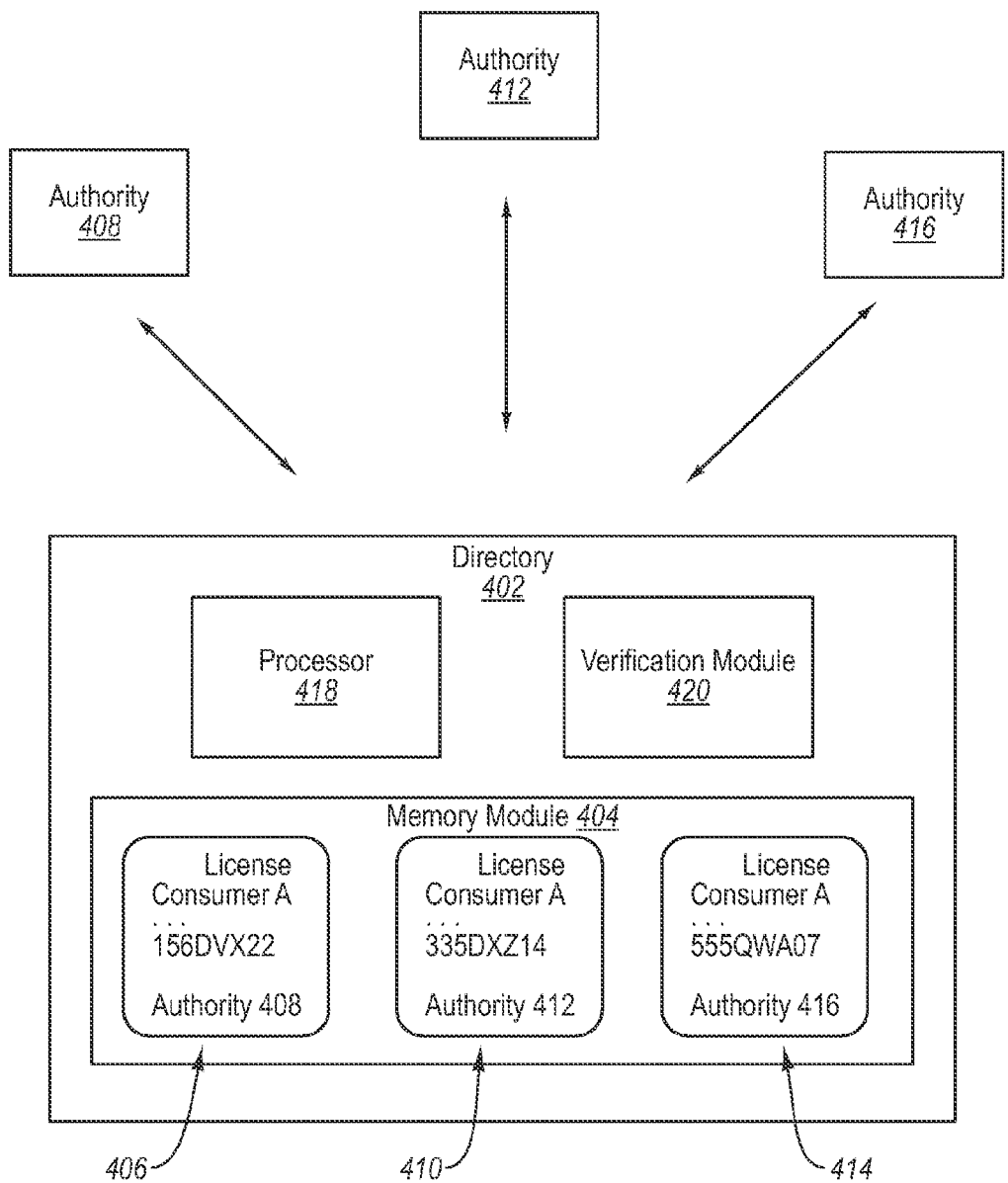
FIG. 4 illustrates a license directory, in accordance with an embodiment of the invention.

In one embodiment, the functionality of store component 306g may be implemented with a directory, such as directory 402 shown in FIG. 4. The owners of licenses may retrieve and use the licenses as they are needed. Directory 402 includes a memory module 404 for storing a plurality of licenses. Memory module 404 is shown with three licenses 406, 410 and 414 belonging to a consumer A for illustration purposes only. Moreover, while licenses are shown, one skilled in the art will appreciate that other credentials, such as private keys may be utilized. Memory module 404 may contain licenses belonging to any number of entities and issued by any number of authorities. License 406 was issued by an authority 408, license 410 was issued by an authority 412 and license 414 was issued by an authority 416.

Figure 5:
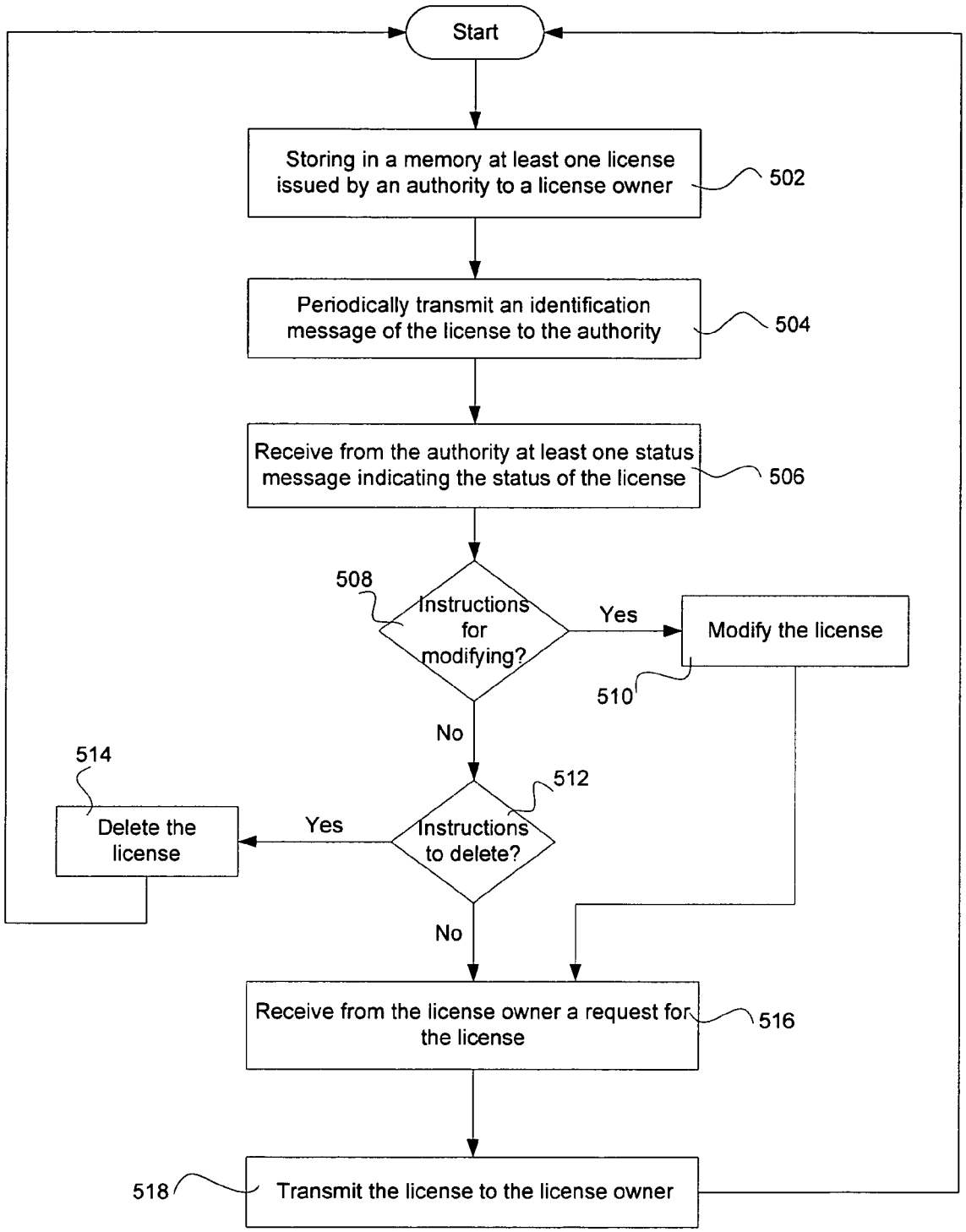
FIG. 5 shows a method that may be used by a directory to verify the status of licenses, in accordance with an embodiment of the invention.

Directory 402 may also include a processor 418 and a verification module 420 that can be used to verify the status of one or more licenses stored in memory module 404. FIG. 5 illustrates an exemplary method that processor 418 and verification module 420 may use to verify the status of a license. In step 502, directory 402 stores in a memory at least one license issued by an authority to a license owner. License 406, for example, was issued by authority 408 and is stored in memory module 404. Next, in step 504, directory 402 periodically transmits an identification message of the license to the authority. The directory may be configured to transmit identification messages hourly, daily, weekly or at any other interval. In one embodiment of the invention, the interval is determined by the authority that issued the license. For example, an authority may desire to have updates more frequently for more sensitive licenses. The identification messages may include a license identification number, e.g., "156DVX22" for license 406. The authority may use the license identification number to determine whether the license has been revoked, replaced or modified. In an alternative embodiment, one or more authorities periodically transmit status messages to directory 402 without first receiving an identification message. For example, an authority may send a status message to a directory when the status of a license has changed. Polling and synchronization may be used when an entity has been disconnected or offline.

In step 506, the directory receives, from the authority, at least one status message indicating the status of the license. The status message may indicate that the license remains valid, has been revoked, has been modified or some other status. In step 508, it is determined whether the status message includes instructions for modifying the license. If the status message includes modification instructions, the license is modified in step 510. A license may be modified by expanding or limiting its scope or duration or modifying any assertion or condition. Next, in step 512, it is determined whether the license includes instructions for deleting the license. A license may be deleted when it has been revoked by the issuing authority. If the status message indicates that the license is to be deleted, the license is deleted in step 514.

Directory 402 may receive, from the license owner, a request for the license in step 516. The license owner may request the license when the license owner desires to use the license, for example. When the issuing authority has not revoked the license, directory 402 may transmit the license to the license owner in step 518.

Returning to FIG. 3, an integrity component 306h may provide mechanisms for signing (digitally) portions of a message and verifying integrity and signatures of received messages in accordance with security policies. A confidentiality component 306i may provide mechanisms for encrypting and decrypting portions of a message. One skilled in the art will appreciate that there are many mechanisms that may be used to implement integrity component 306h and confidentiality component 306i and that in some embodiments a security policy makes a selection from the available options.

Figure 6:
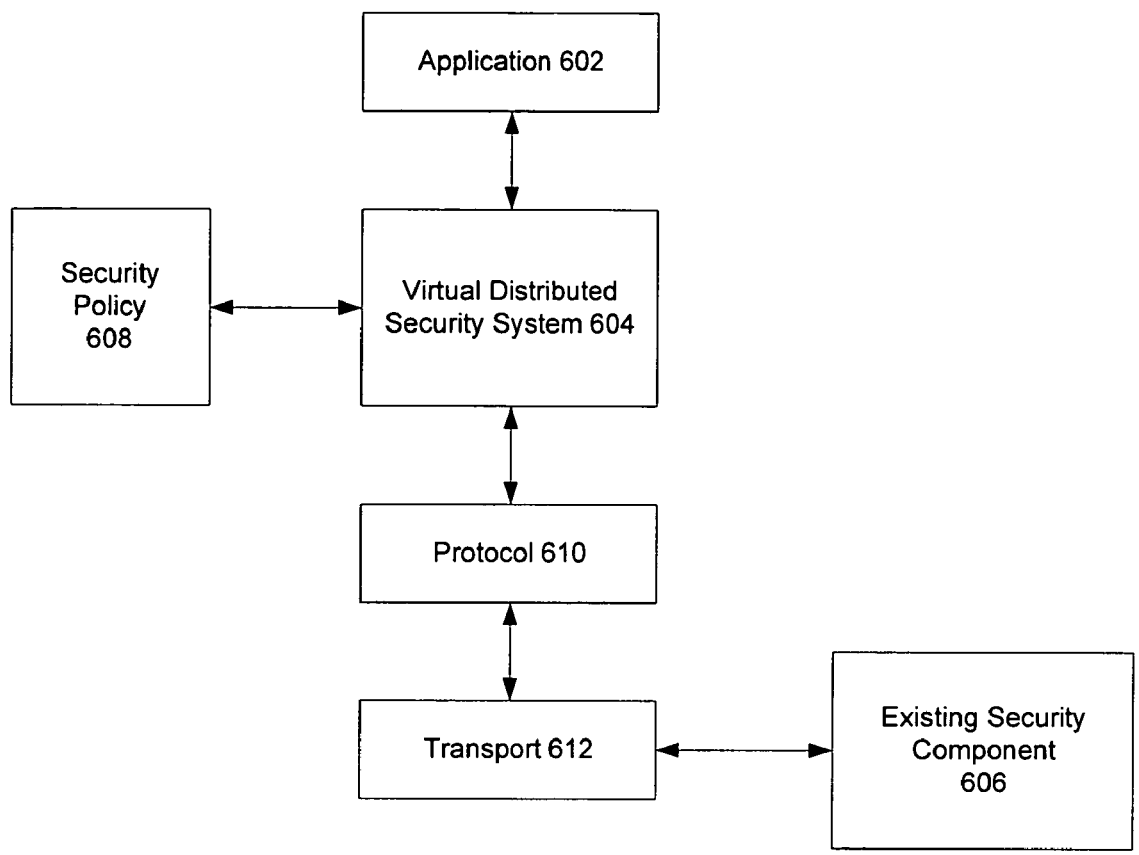
FIG. 6 illustrates how an application using a virtual distributed security system can communicate with an existing security component, in accordance with an embodiment of the invention.

One of the advantages of abstracting underlying protocols and transports is that abstraction facilitates interoperability with other systems. FIG. 6 illustrates how an application 602 using a virtual distributed security system 604 can communicate with an existing security component 606. Interoperability can occur because virtual distributed security system 604 may select the most appropriate protocol 610 and transport 612 based on information included in a security policy 608. In one aspect of the invention, protocol 610 may be a composable protocol. Virtual distributed security system 604 may be built as a set of services with an application programming interface (API) that application 602 may utilize. The API allows application 602 and system virtual distributed security system 604 to communicate with one another through a variety of different mechanisms such as, but not restricted to RPC, SOAP, or shared memory.

Figure 7:
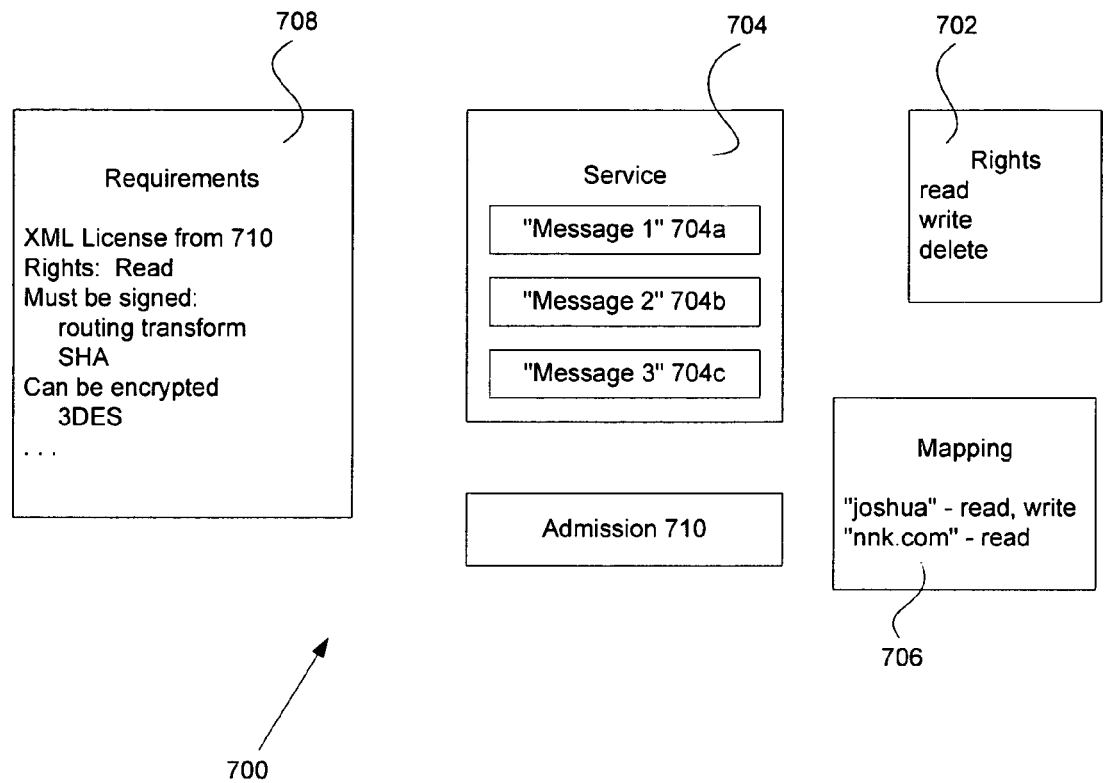
FIG. 7 illustrates elements of a security policy that may be utilized for permission processing, in accordance with an embodiment of the invention.

FIG. 7 illustrates elements of a security policy 700 that may be utilized for permission processing. Policy 700 may define the security rights 702 associated with each service 704 and the mappings of rights to identities 706. Such mappings could be based on many criteria including, but not limited to, name, authority, credential type, associated group, or associated roles. Policy 700 may also define different messages 704a-704c that a service 704 receives and requirements 708 of each of messages 704a-704c. For example, one or more credential, integrity, confidentiality or right requirements may vary by message. That is, it may be required that a message is signed or encrypted, and it may indicate the supported/required algorithms to use. Policy 700 illustrates an example in which an XML license is required from an admission component 710. Additionally, a requirement may specify which application protocol elements must be signed and those application protocol elements that are required for a message.

A policy language used to create a security policy may define the functionality of a component using security primitives. The security primitives may be in combination with traditional programming elements. Those skilled in the art will recognize that security primitives can take various forms. In one embodiment, the primitives might be high-level constructs like "create a license" or "manage storage of a license" which are controlled by the use of parameters. For example the policy 802, shown in FIG. 8, for an admission component 804 might represent "create a license of type X for name N using key Y signed by license L." In another embodiment, the primitives might be very low-level constructs such as "fetch the template for type X; replace the 'name' with N; set the 'date' field to 'Oct. 24, 2001', set the 'authority' field to Z; set the 'key' field to Y; sign fields 'name', 'date', 'authority', and 'key' with license L using algorithm Y". Of course, other embodiments of the invention may combine different levels of constructs.

Security policies, such as security policy 802 allow a definition of a distributed security system without the writing of code. Among other advantages, a security system that does not require the writing and rewriting of code allows for custom components to be inserted to augment or replace specific steps. Such components could be provided by, but not limited to, native processor code, Java beans or other Java language derivatives, or Microsoft CLR modules.

Figure 9:
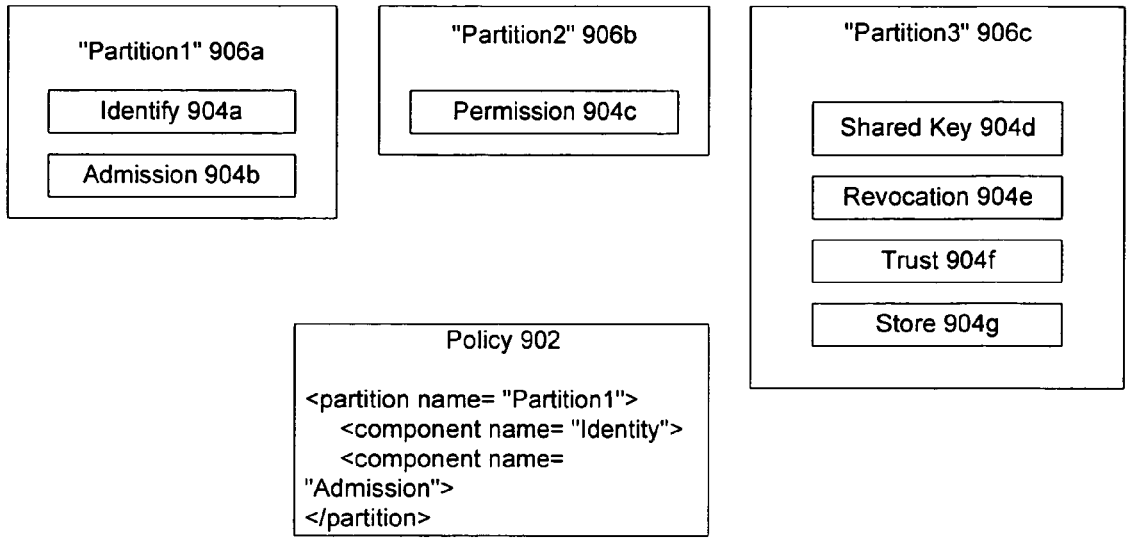
FIG. 9 illustrates a security policy that specifies how to partition service components, in accordance with an embodiment of the invention.

In one aspect of the invention, each security module may be described independently and a security policy can then indicate how to combine modules, and, how to deploy modules. Such information may be part of the policy, or part of an independent deployment mechanism. Providing flexibility in describing, combining and deploying modules allows a distributed security system to support partitioning, replication, and farming. For example, in FIG. 9, policy 902 might specify how to partition service components 904a-904g into separate partitions 906a-906c. Those skilled in the art will appreciate that in addition to security related services, the teachings shown in FIG. 9 may be applied to non-security related services.

Figure 10:
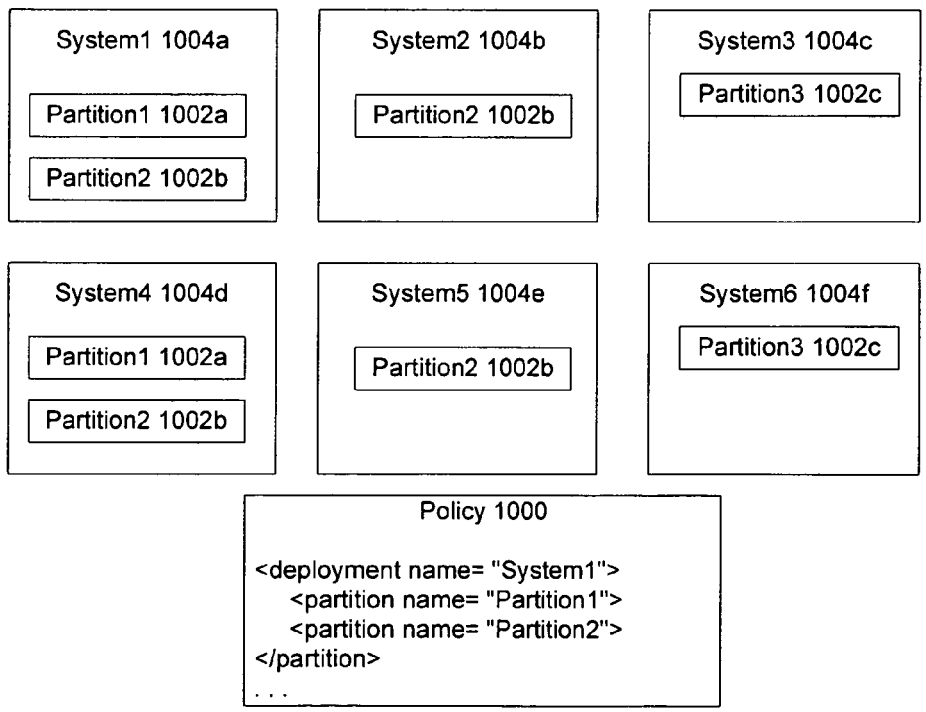
FIG. 10 illustrates a security policy that specifies how partitioned service components maybe deployed to systems, in accordance with an embodiment of the invention.

Similarly, a policy, such as policy 1000 shown in FIG. 10 might further specify which partitions 1002a-1002 are deployed to systems 1004a-1004f in a distributed computing systems. Systems 1004a-1004f may be implemented with applications, computing devices, separate processors of a multiprocessor system or other hardware or software. As is shown in FIG. 10, a single partition may be present on more than one system of the distributed computing system.

A distributed security system may abstract cryptographic objects and operations to make the system independent of the underlying cryptographic technology. Licenses have been described above and may be a credential that is given to another party to identify oneself. Examples of licenses include X.509 certificates and Kerberos tickets. A "testament" may be proof that a party uses to prove that they own a license or a key within the license. For example, an X.509 certificate contains a public key and a corresponding testament may be the associated private key. Similarly, a Kerberos ticket includes an encrypted symmetric key and the testament may be the symmetric key itself.

A security policy may utilize elements such as licenses and testaments to create a single programming model for securing messages using operations such as sign, verify, encrypt, and decrypt. To sign a message, the license owner, for example, may encrypt a digest of the message with their testament. The holder of a license may verify the signature. Similarly, to encrypt a message, an entity may use a key in the recipient's license. The recipient may decrypt the message using a testament belonging to the recipient. In embodiments that utilize public keys, a message may be encrypted with a generated symmetric key and the symmetric key may be encrypted with a public key from the license.

Figure 11:
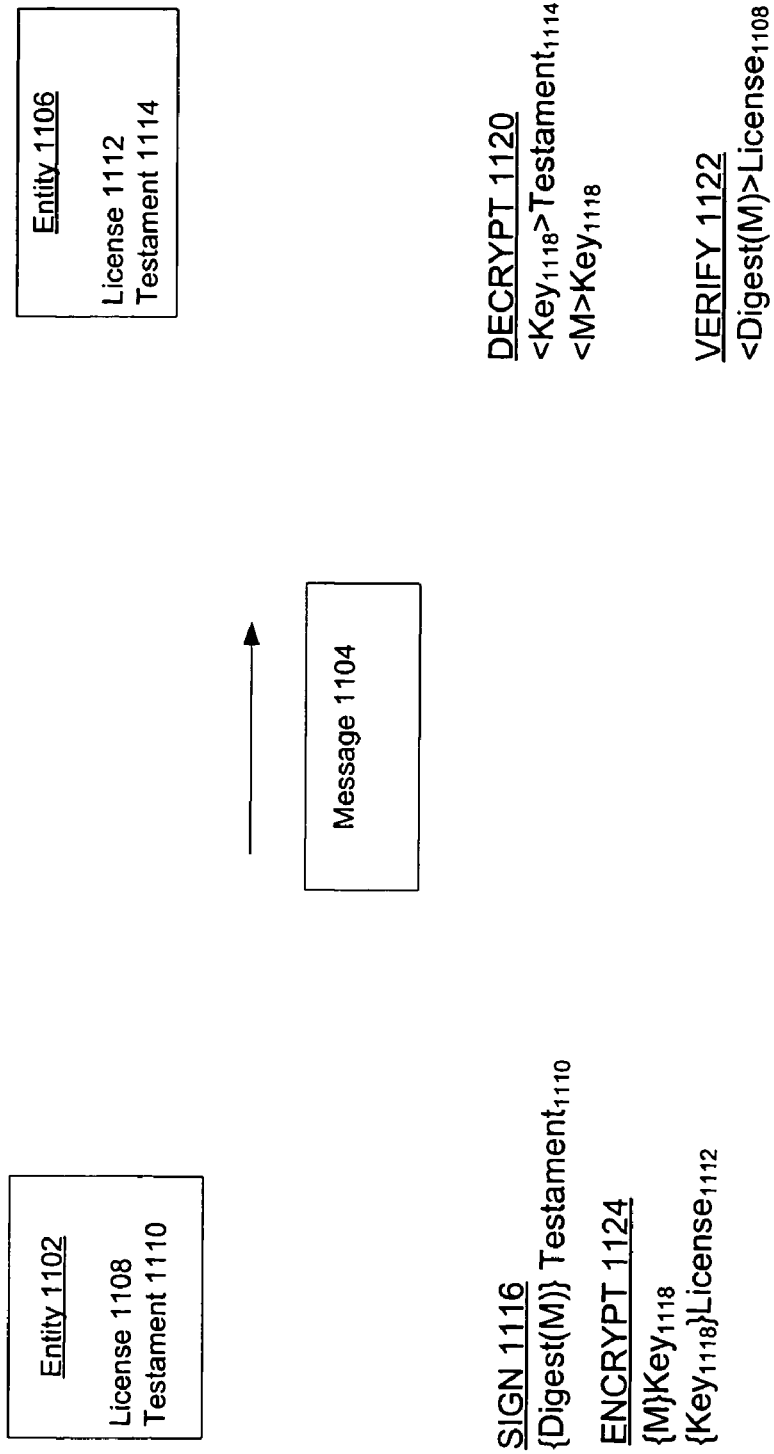
FIG. 11 illustrates a method of sending secure messages in accordance with an embodiment of the invention.

FIG. 11 illustrates an example in which an entity 1102 sends a message 1104 to another entity 1106. Entity 1102 owns a license 1108 and a testament 1110. Similarly, entity 1106 owns a license 1112 and a testament 1114. Entities 1102 and 1106 wish for message 1104 to be secure. Entity 1102 initiates a sign operation 1116 on message 1104 by computing a digest of message 1104 and then encrypting the digest with its testament 1110. Next, entity 1102 may perform an encrypt operation 1124. Entity 1102 may create a key 1118 and encrypt message 1104 with key 1118. Key 1118 may then be encrypted using license 1112, which belongs to entity 1106. The encryption of key 1118 may involve encrypting key 1118 with a key found in license 1112. The encrypted message, the encrypted key, and the signature are transmitted to entity 1106. In other embodiments of the invention, credentials other than keys may be utilized.

Entity 1106 can perform a decrypt operation 1120 to decrypt key 1118 using its testament 1114. Using key 1118, entity 1106 can decrypt message 1104. Next, entity 1106 may perform a verify operation 1122. Entity 1106 may compute a digest of message 1104 and compare the computed digest with the digest sent by entity 1102 using license 1108.

One of the advantages of the present invention is that applications running for entities 1102 and 1106 may be the same, regardless of whether licenses 1108 and 1112 contain public keys, symmetric keys, digest keys, or other forms of credentials. The specifics of the cryptographic algorithms may be handled by the security system, not the application. Handling cryptographic algorithms with a security system is particularly desirable when heterogeneous credentials are used. That is, licenses 1108 and 1112 use different cryptographic techniques. In traditional systems, applications must be aware of this and be coded specifically for the presence of diverse cryptographic techniques. The present invention abstracts cryptographic techniques and does not require applications to be aware of the cryptographic technologies being used. As a result, cryptographic techniques can be altered at any time simply by altering a security policy.

The disclosed security model can be used to create richer environments. For example, while describing FIG. 3, it was indicated that admission component 306b might accept public key credentials and generate symmetric key licenses. The logic in admission component 306b or in any other service may be the same regardless of the type of license used. With such a service, the services can have increased scalability by simply using a symmetric key license. The operation of receiving a license and then issuing another license is defined as a re-issuance operation because component 306b is "re-issuing" the sender's license using its own format. In some cases, component 306b, or a similar component, might return a license with the same key. For example, component 306b may accept an X.509 certificate, but return an XML license with the same public key because component 306c only accepts XML licenses.

Re-issuance may form the basis of a delegation operation. A party A may make a specific delegation to another party B. To do this, A may re-issue A's license specifying the delegations (as well as any conditions) and sign the license as the issuing authority. To use this new license, B may be required to present the license, proof of ownership (e.g. a signature), and A's license (if the recipient doesn't have it). The recipient may then verify that B owns the license and the A issued it, and that the delegations in the license correctly correspond to A's license. The abstraction of cryptographic technologies and, specific license formats, allows applications to use a consistent programming model independent of the cryptographic technologies or license formats used at any specific time.

Another use of licenses and key abstraction is service scalability. Existing systems are typically limited when creating special keys for communications because only the client and the service know the key and state on the service limits scalability. The existing approach has limitations when a service is implemented as part of a server farm. Aspects of the present invention allow the service to re-issue the sender's license providing a session key, but encrypting it with a secret key that is shared across the farm, possibly using the shared key service 306d. Consequently, any server in the farm that receives a message can understand and process the message since it can abstract the session key, and no state is required to be maintained on the farm. Similarly problems arise in existing systems when a client is part of a farm. The technique described above may also be used by the client to provide a license to the service to use on its reply so that any client farm member can service the message.

Security credentials may be passed between components or services using the simple object access protocol SOAP. In one embodiment of the invention, credentials, such as licenses, may be passed with SOAP messages by including them in a SOAP "credentials" header. The header may allow for any type of credential to be passed. Message integrity can be associated with SOAP messages by including digital signatures or other integrity mechanisms in a SOAP "integrity" header. For example, this header can contain XML Signatures as defined in the W3C standard. Message confidentiality can be achieved by associating an XML tag encryption technology with SOAP messages. One such scheme is the XML Encryption standard as defined by the W3C. Confidentiality of message attachments may be achieved by including a manifest (and encryption meta-data) of the encrypted attachments in a SOAP "confidentiality" header.

We claim:

1. In a distributed computing system environment that includes a plurality of computing devices that each comprise a processor and system memory, a method of delegating security credentials within a generic security framework, wherein the generic security framework abstracts cryptographic technologies and license formats, the method comprising:

receiving a first license from a first party wherein the first license is formatted with a first license format associated with the first party;

determining that the first license is to be delegated to a second party;

a processor identifying a second license format required by the second party from a modular security policy, wherein the modular security policy:

establishes security rules and procedures of the generic security framework; implements a security policy of the generic security framework with one or more protocols and transports; and describes security aspects, including properties, capabilities, requirements and interaction semantics, of a plurality of modular security components which define security rights corresponding to use of the first license by the first and second parties and which are written in a security policy language as selectable, deployable and combinable security modules and which enables the modular security components to be negotiated, partitioned and modified, rather than being hard-coded and which include:
- an admission component for mapping external credentials to internal credentials and for performing a re-issuance operation;
- a permission component for pre-fetching rights, capabilities and access control information; and
- a trust component for managing trust relationships and for specifying the extent to which a party is trusted;

using the modular security policy to identify security rights corresponding to the use of the first license by the second party;

re-issuing the first license to the second party as a re-issued license;

using the modular security policy to specify delegations and conditions for the use of the re-issued license by the second party;

signing the re-issued license with the first license, naming the first party as an issuing authority;

providing the re-issued license to the second party in the second license format, which is distinguished from the first license format; and providing the first license to the second party so that the second party can prove that the first party delegated the first license as the re-issued license and that the delegations in the re-issued license correctly correspond to the first license.

2. The method of claim 1, wherein:
the modular security policy identifies access rights of the security system.

3. The method of claim 1, wherein:
the security policy language comprises the extensible markup language.

4. The method of claim 1, wherein:
the modular security policy is configurable.

5. The method of claim 1, wherein:
the security policy language comprises at least some logic-based components.

6. The method of claim 1, wherein:
the security policy language comprises at least some rule-based components.

7. The method of claim 1, wherein:
the security policy language comprises procedural components.

8. The method of claim 1, wherein the modular security policy includes a revocation service.

9. The method of claim 1, wherein the modular security policy includes a mapping of entities to rights.

10. The method of claim 9, wherein the modular security policy further includes a mapping of entities to capabilities.

11. The method of claim 1, wherein providing the re-issued license to the second party further comprises providing a session key to the second party wherein the session key is encrypted with a secret key which is shared among a plurality of parties, the parties all using the generic security framework.

12. A computer program product for use at a computer system, the computer program product for implementing a method of delegating security credentials within a generic security framework, wherein the generic security framework abstracts cryptographic technologies and license formats, the computer program product comprising one or more computer-readable storage media having stored thereon computer-executable instructions that, when executed at a processor, cause the computer system to perform the method, including the following:

receive a first license from a first party wherein the first license is formatted with a first license format associated with the first party;

determine that the first license is to be delegated to a second party;

identify a second license format required by the second party from a modular security policy, wherein the modular security policy:
- establishes security rules and procedures of the generic security framework; implements a security policy of the generic security framework with one or more protocols and transports; and
- describes security aspects, including properties, capabilities, requirements and interaction semantics, of a plurality of modular security components which define security rights corresponding to use of the first license by the first and second parties and which are written in a security policy language as selectable, deployable and combinable security modules and which enables the modular security components to be negotiated, partitioned and modified, rather than being hard-coded and which include:
  - an admission component for mapping external credentials to internal credentials and for performing a re-issuance operation;
  - a permission component for pre-fetching rights, capabilities and access control information; and
  - a trust component for managing trust relationships and for specifying the extent to which a party is trusted;

use the modular security policy to identify security rights corresponding to the use of the first license by the second party;

re-issue the first license to the second party as a re-issued license;

use the modular security policy to specify delegations and conditions for the use of the re-issued license by the second party;

sign the re-issued license with the first license, naming the first party as an issuing authority;

provide the re-issued license to the second party in the second license format, which is distinguished from the first license format; and provide the first license to the second party so that the second party can prove that the first party delegated the first license as the re-issued license and that the delegations in the re-issued license correctly correspond to the first license.

13. The computer program product of claim 12, wherein the modular security policy identifies access rights of the security system.

14. The computer program product of claim 12, wherein the security policy language comprises the extensible markup language.

15. The computer program product of claim 12, wherein the security policy language comprises one or more of logic-based components, rule-based components, and procedural components.

16. The computer program product of claim 12, wherein the modular security policy includes a revocation service.

17. The computer program product of claim 12, wherein the modular security includes a mapping selected from among the list of: (a) a mapping of entities to rights and (b) a mapping of entities to capabilities.

18. The computer program product of claim 12, wherein computer-executable instructions that, when executed at a processor, cause the computer system to provide the re-issued license to the second party further comprise computer-executable instructions that, when executed at a processor, cause the computer system to providing a session key to the second party wherein the session key is encrypted with a secret key which is shared among a plurality of parties, the parties all using the generic security framework.

19. The computer program product of claim 12, wherein the modular security policy is configurable.

20. A computer system, the computer system comprising:
one or more processors;
system memory; and
one or more computer-readable storage media having stored thereon computer-executable instructions representing a virtual distributed security system, wherein the virtual distributed security system is configured to:
  receive a first license from a first party wherein the first license is formatted with a first license format associated with the first party;
  determine that the first license is to be delegated to a second party;
  identify a second license format required by the second party from a modular security policy, wherein the modular security policy:
    establishes security rules and procedures of the generic security framework; implements a security policy of the generic security framework with one or more protocols and transports; and
    describes security aspects, including properties, capabilities, requirements and interaction semantics, of a plurality of modular security components which define security rights corresponding to use of the first license by the first and second parties and which are written in a security policy language as selectable, deployable and combinable security modules and which enables the modular security components to be negotiated, partitioned and modified, rather than being hard-coded and which include:
      an admission component for mapping external credentials to internal credentials and for performing a re-issuance operation;
      a permission component for pre-fetching rights, capabilities and access control information; and
      a trust component for managing trust relationships and for specifying the extent to which a party is trusted;
  use the modular security policy to identify security rights corresponding to the use of the first license by the second party;
  re-issue the first license to the second party as a re-issued license;
  use the modular security policy to specify delegations and conditions for the use of the re-issued license by the second party;
  sign the re-issued license with the first license, naming the first party as an issuing authority;
  provide the re-issued license to the second party in the second license format, which is distinguished from the first license format; and
  provide the first license to the second party so that the second party can prove that the first party delegated the first license as the re-issued license and that the delegations in the re-issued license correctly correspond to the first license.

* * * * *